Patented Aug. 16, 1932

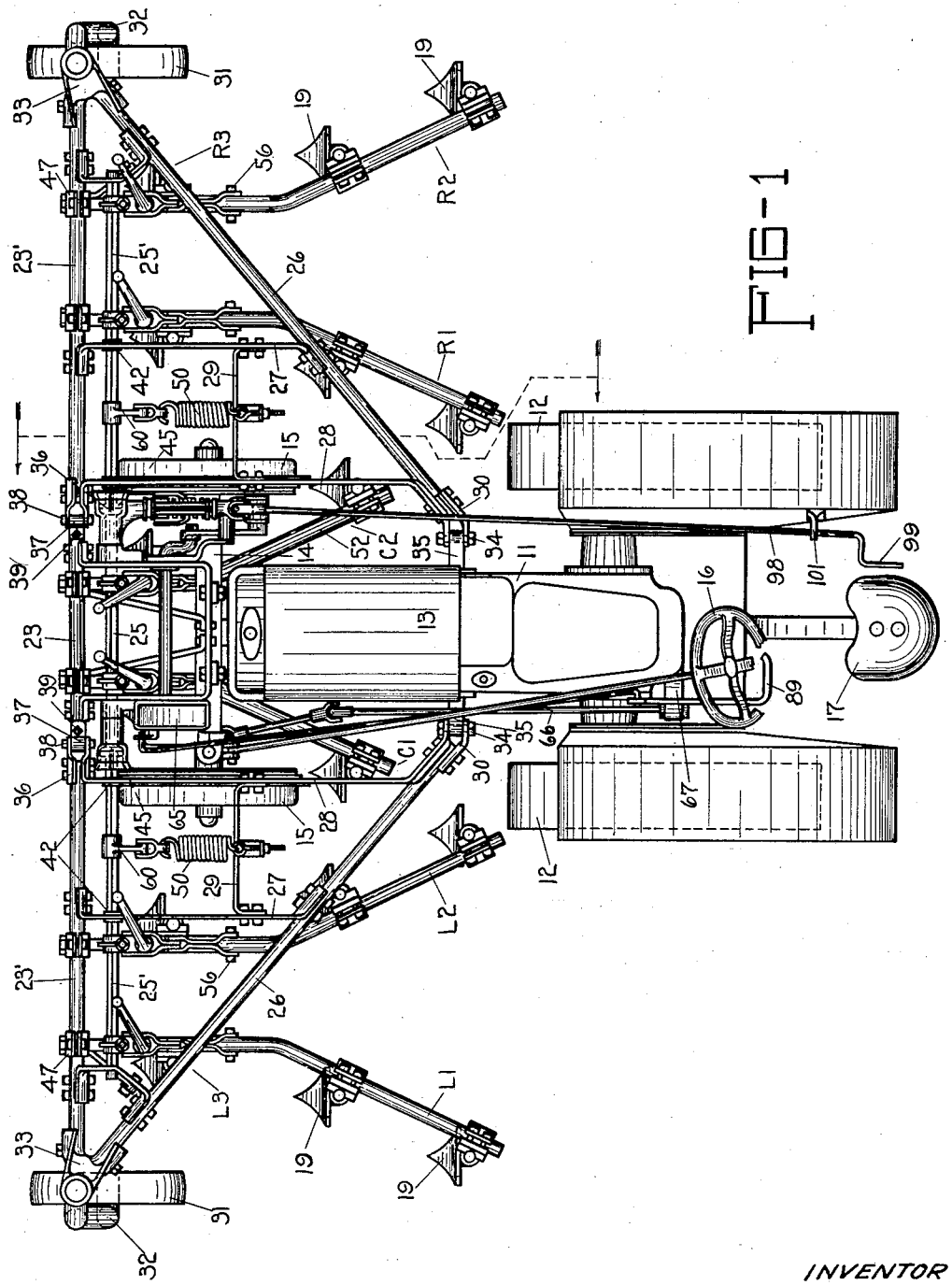

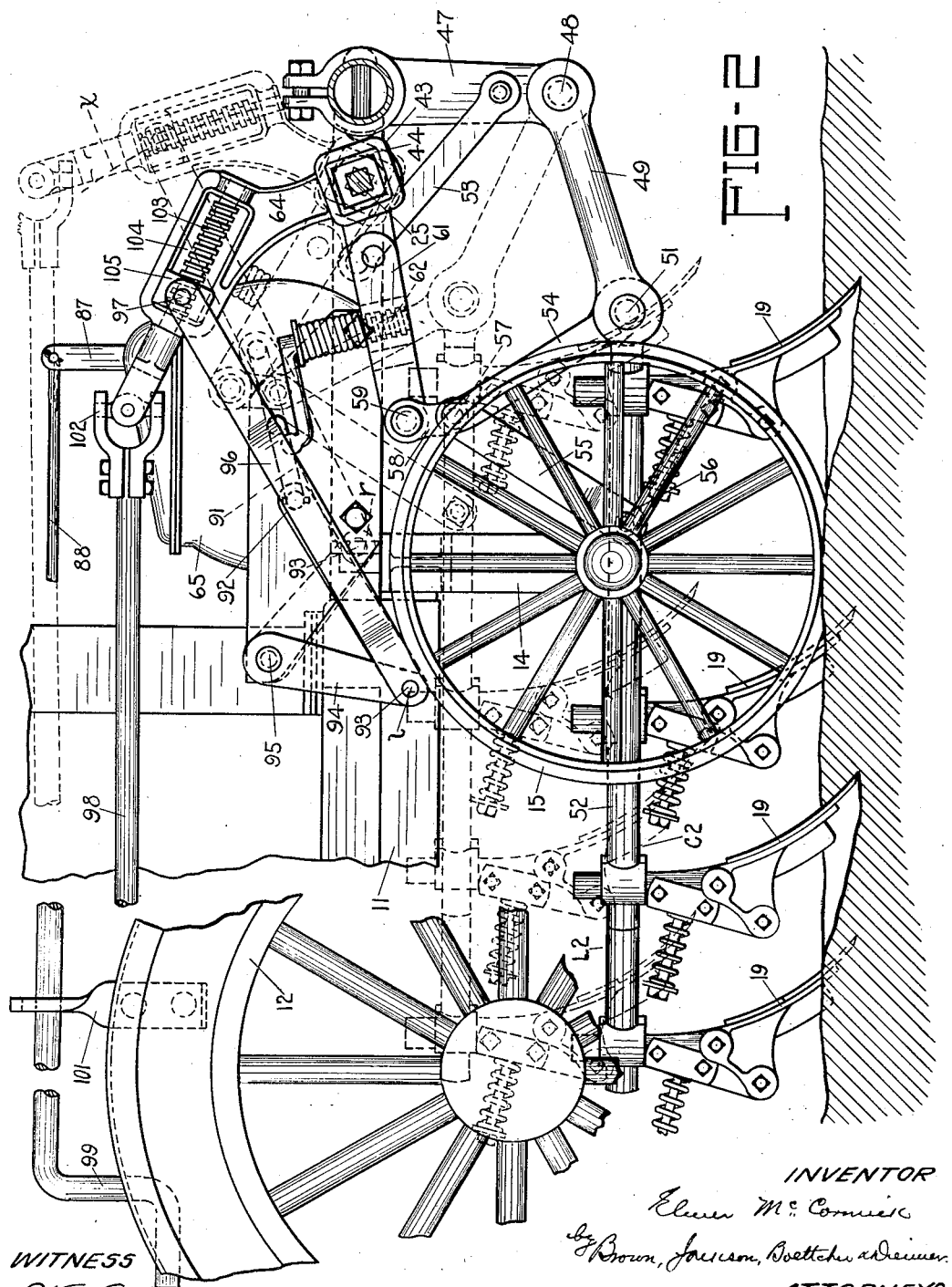

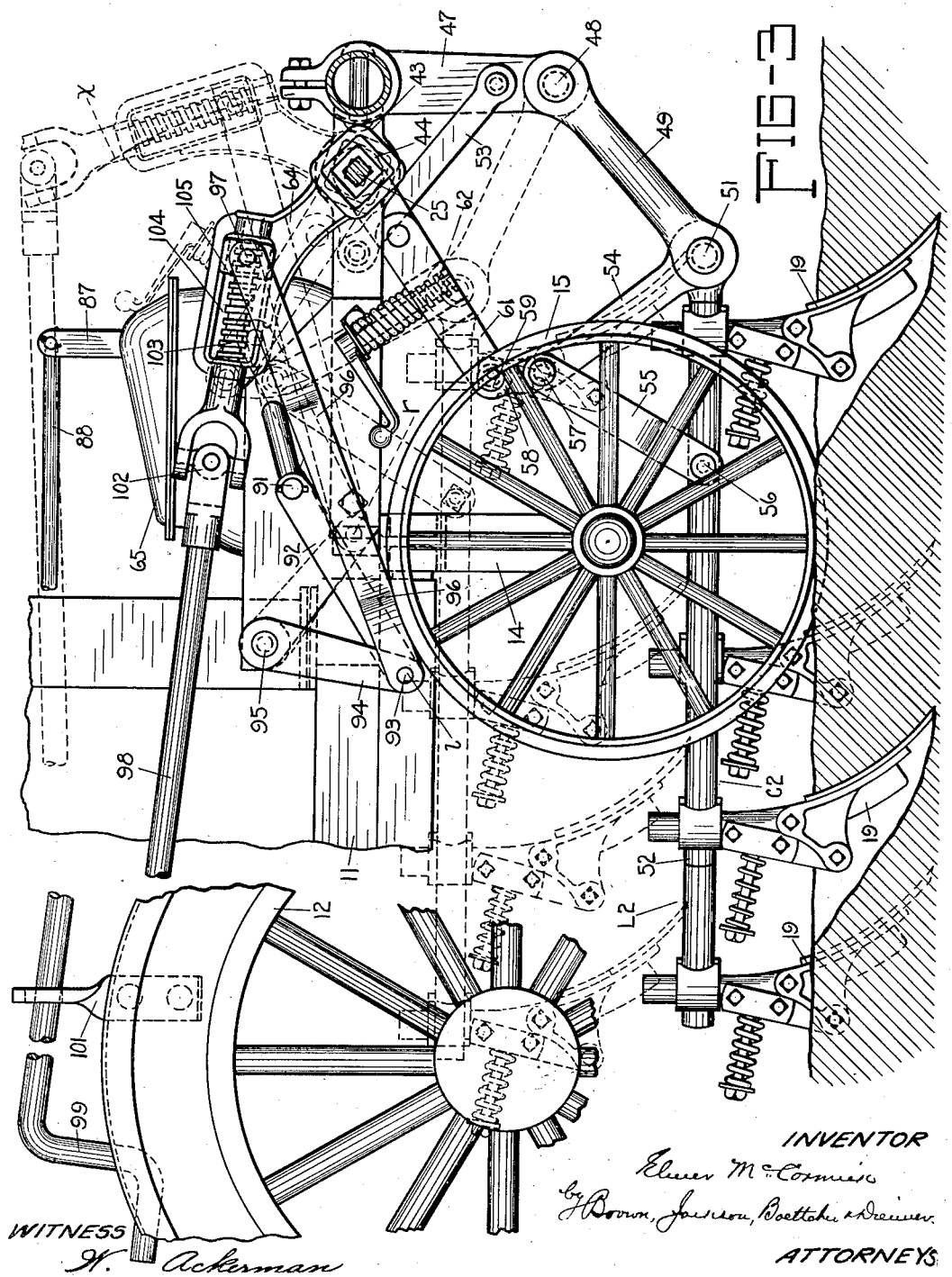

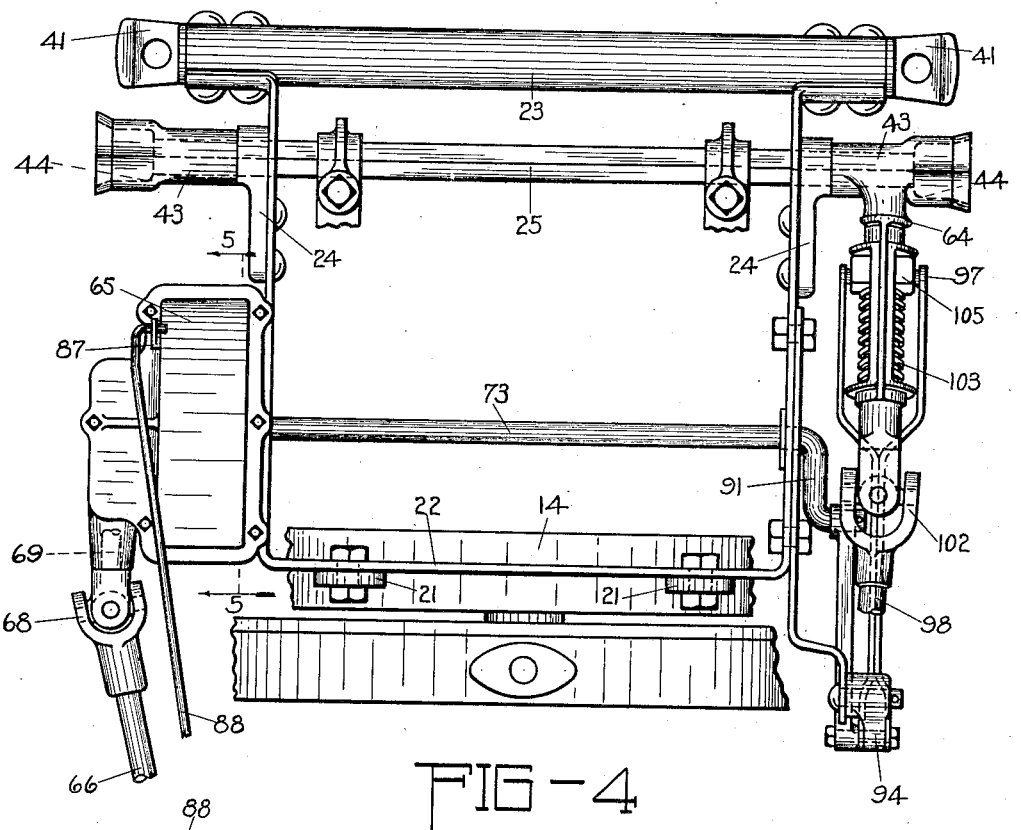
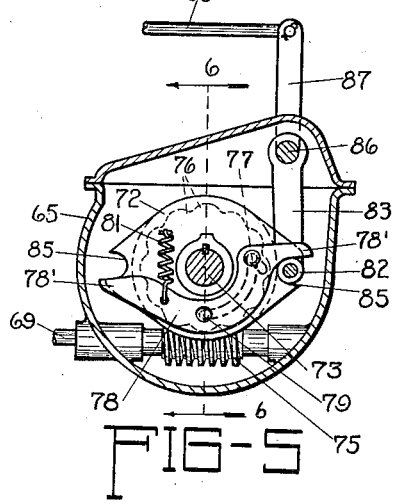
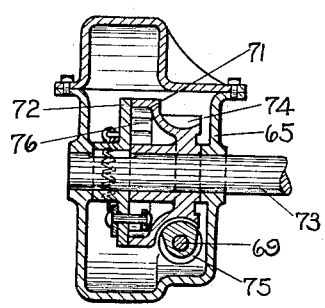

1,872,314

UNITED STATES PATENT OFFICE

ELMER McCORMICK, OF WATERLOO, IOWA, ASSIGNOR TO JOHN DEERE TRACTOR COMPANY, OF WATERLOO, IOWA, A CORPORATION OF IOWA

POWER LIFT CULTIVATOR

Application filed February 27, 1928, Serial No. 257,177. Renewed May 13, 1932.

The present invention relates to cultivators and other types of tilling implements which are characterized by power lift mechanism for raising the soil tilling members or rigs to their inoperative position, as when the implement is to be turned at the ends of the field, or is to be transported to or from the field. In the type of implement to which the invention has particular reference, represented, for example, by tractor cultivators, there is usually provided a suitable construction of manually operated mechanism for adjusting the tilling depth of the rigs. In such implements as heretofore constructed, the height of lift of the rigs, upon the operation of the power lift mechanism, has been dependent upon the depth adjustment which has been given the rigs. For example, if the rigs have been manually adjusted to cultivate at a considerable depth, the power lift mechanism will only serve to raise them to a comparatively low height above the ground, with the result that the rigs may fail to clear the plants or hills in turning, or may strike obstacles on the ground when the implement is being transported. Conversely, if the rigs have been manually adjusted for a comparatively shallow depth of cultivation, the operation of the power lift mechanism will tend to raise them to a considerable height, with the result that some rigs may strike frame portions of the implement;—or, in an effort to avoid this, requiring that the implement or tractor frame be designed to provide extensive clearance for the rigs.

The fundamental object of the present invention is to avoid these difficulties by providing mechanism which will always raise the rigs substantially to the same predetermined height irrespective of the depth adjustment which has been given the rigs by the manual adjusting means. Other objects of the invention pertaining to the specific construction of this mechanism, and to other features of the implement, will appear in the following description of a preferred embodiment of the invention. In the accompanying drawings illustrating such embodiment:

Fig. 1 is a plan view of the present cultivator.

Fig. 2 is a side view, illustrating the front and rear portions of the implement fragmentarily, and showing in full lines the position of the operating parts when the rigs are adjusted for a comparatively shallow depth of cultivation.

Fig. 3 is a similar view, showing in full lines the position of the operating parts when the rigs are adjusted for relatively deep cultivation, and also showing in dotted lines the position of these parts when the rigs are raised to their inoperative positions.

Fig. 4 is a fragmentary plan view showing the mounting of the central portion of the cultivator unit on the tractor unit.

Fig. 5 is a sectional view through the power lift mechanism, corresponding to a section taken approximately on the plane of the line 5—5 of Fig. 4; and Fig. 6 is another sectional view of this same mechanism, taken on the plane of the line 6—6 of Fig. 5.

The present cultivator comprises a main or tractor frame 11, of any design suitable to support the parts of the implement, and supported at the rear by traction wheels 12 arranged to be propelled by a motor mounted on said frame and enclosed in a housing or hood 13 at the front end of the tractor, in accordance with the usual practice. The front end of the tractor frame 11 has pivotal mounting on a front axle 14 which supports the front steering wheels 15 at its outer ends, the pivotal mounting of the tractor frame on the axle 14 permitting transverse rocking movement between the frame and axle. The wheels 15 have swivel mounting on the ends of the axle 14, similarly to the mounting of automobile wheels, and are arranged to be steered through a steering wheel 16 which is disposed in proximity to the operator's seat 17 at the rear end of the tractor.

The cultivator unit of the implement is preferably constructed in the form of an attachment adapted for mounting on the front end of the tractor unit just described. The general construction of this cultivating unit, including the manner of mounting the same on the tractor and the relation of the several cultivating rigs, follows quite closely certain prior constructions, represented, for example, by the disclosure in the copending application of Theophilus Browning, Serial No. 128,829, filed August 13, 1926. I shall, therefore, only describe so much of the design of the cultivator as is necessary to an understanding of its general construction and mode of operation. The unit comprises two cultivating rigs L1 and L2 disposed at the left side of the implement, two cultivating rigs R1 and R2 disposed at the right side thereof, and two centrally disposed cultivating rigs C1 and C2. These rigs carry the usual cultivator shovels or other types of tilling tools 19, and the several rigs are so disposed as to cultivate the soil on both sides of three plant rows, as is well known in these implements, it being also noted that the central cultivator rigs C1 and C2 are effective for cultivating or loosening the soil which has been traveled over by the front wheels 15.

Referring to Fig. 4, it will be noted that the front axle 14 of the tractor is provided with upwardly extending lugs or some similar fastening devices 21, to which is secured a U-shaped frame member 22. Secured to and carried by the front ends of such frame member is a rig supporting bar 23, and secured to the side portions of the frame member 22, in rear of the bar 23, are bearing brackets 24 in which a transversely extending rock shaft 25 is journaled. The centrally disposed cultivator rigs C1 and C2 are carried on the frame bar 23, and receive their raising and lowering motion from the rock shaft 25, as will be presently described. Referring again to Fig. 1, the laterally positioned cultivator rigs L1, L2 and R1, R2 are mounted on outwardly extending frames L3 and R3 respectively. These frames are of triangular formation and comprise front frame bars 23' and diagonally extending rear bars 26, the latter being rigidly secured to the outer ends of the frame bars 23' in any suitable manner. Each outwardly extending frame also comprises two parallel bars 27 and 28 which are secured at their front and rear ends to the frame bars 23' and 26 respectively, said parallel frame bars being reinforced by a transversely extending brace bar 29. The outer ends of said frames L3 and R3 are supported on castor wheels 31, which are journaled on axles 32 having swivel mounting in brackets 33 carried by such frames. The inner ends of the frames are pivotally connected to the tractor on longitudinally extending axes, so that the outer ends of the frames can swing upwardly or downwardly transversely of the implement as the castor wheels 31 travel over uneven ground. To this end, each diagonally extending frame bar 26 is provided with pivot lugs 30 which engage over a pivot bolt 34 carried by an arm or bracket 35 which projects laterally from the tractor. Similarly, the inner end of each front frame bar 23' is provided with a pair of lugs 36 which embrace a bracket 37 and receive a pivot bolt 38, which passes through the lugs 36 and bracket 37. Each bracket 37 is secured by a bolt 39 to an apertured extension 41 (Fig. 4) on the adjacent end of the central frame bar 23.

Each lateral frame L3 and R3 is provided with a rock shaft 25' which is disposed substantially coextensively with the central rock shaft 25, the outer sections 25' of this rock shaft having suitable bearing support in their respective frames, as in bearing members 42 carried by the frame bars 27 and 28. As best shown in Fig. 4, both ends of the central section 25 of the rock shaft have secured thereto sleeves 43, in the outer ends of which are formed coupling sockets 44. These sockets are of polygonal cross section, and are adapted to receive correspondingly formed heads 45 (Fig. 1) which are secured to the outwardly extending shaft sections 25'. The construction is such that a universal joint action is afforded between the driving socket 44 and the driving head 45, whereby the outer shaft sections 25' can tilt upwardly and downwardly in the tilting movement of the frames L3 and R3 without interfering with the transmission of rocking movement from the central shaft section 25 to the lateral shaft sections 25'.

It will be observed from the foregoing that each lateral frame, together with its cultivating rigs, can be quickly removed from the tractor by merely releasing the bolts 34 and 38 and withdrawing the driving heads 45 from the driving sockets 44.

I shall now describe, in connection with Figs. 2 and 3, the mounting of one of the central cultivator rigs C1—C2, and the manner in which said rigs are raised and lowered by the movement of the central rock shaft section 25. The mounting of the laterally disposed rigs on the outwardly extending frames L3 and R3, and the manner of raising and lowering such rigs from the outwardly extending rock shaft sections 25', correspond in all material respects with the mounting and operation of the central rigs, and will be understood from a description of the latter. Clamped or otherwise secured to each supporting bar section 23—23', substantially in the fore and aft plane of each cultivator rig, is a depending bar 47 which transmits the draft pull of the implement to such cultivator rig. Pivotally connected to the lower end of this bar, as indicated at 48, is a draft link 49, the rear end of which is pivotally connected at 51 to the beam 52 of the rig. To reinforce the depending bar 47 against the draft forces of the rig, a brace bar 53 is extended between the lower portion of the draft bar 47 and a fixed point on the frame of the implement. The cultivating devices 19 are mounted on the beam 52 in any suitable manner, and may be provided with spring devices adapted to yield if the cultivator device strikes an obstruction in the ground, such spring devices constituting no part of the present invention. The beam 52 is adapted to be raised and lowered through a parallel movement so that in all positions of the beam it will be disposed substantially parallel to the ground, or at substantially the same angle with reference to the ground, it being noted that the linked connection 49 between the front end of the beam and the depending bar 47 will permit such parallel movement. The raising and lowering of the beam is effected through two links 54 and 55, the front link 54 being connected to the beam at the pivot pin 51, and the rear link 55 being connected to the beam at a point spaced rearwardly along its length, represented by the pin 56. The upper ends of said links are connected together by a pin 57, and pivotally connected to this pin is a short, upwardly extending link 58. The upper end of the latter link is pivoted at 59 to an arm 61 which extends rearwardly from the rock shaft section 25 in substantial parallelism with the link 49. Thus the arm 61 and link 49 constitute substantially a parallel link connection through which motion is transmitted to the ring from the power lift mechanism and the manually adjustable means hereinafter described. It is usually desirable to provide independent depth adjusting mechanism for each rig so that the several rigs can be manually adjusted independently of each other for different depths of cultivation, in order to adapt the implement to the proper cultivation of hilled or listed plant rows. Such independent adjusting mechanism is preferably embodied in the arm 61, as by constructing the same of two jointed sections, and providing a crank actuated, adjusting screw 62 in such relation as to provide for changing the angularity between said jointed sections. These independent adjusting devices do not constitute any part of the present invention and need not be described in detail. It will be evident from the foregoing that rocking of the shaft section 25 in one direction will move the cultivator rigs downwardly for a shallow depth of cultivation, as illustrated in Fig. 2, or for deep cultivation, as illustrated in Fig. 3, and that rocking movement of said shaft in the other direction will raise the rigs to their transport position, as indicated in dotted lines in both of said figures. What has been said of the central cultivating rigs C1 and C2 also applies to the outwardly disposed rigs L1, L2 and R1, R2, since the laterally extending shaft sections 25' rock with the central shaft section 25.

Referring to Fig. 1, the weight of the several cultivator rigs may be counterbalanced by tension springs 50 having adjustable connection at their rear ends with the frame bars 29, and having linked connection at their front ends with arms 50 extending from the rock shaft sections 25'. Rocking movement is transmitted to the three shaft sections 25—25' through an arm 64, which extends upwardly from one of the sleeve members 43, which are mounted on the ends of the central shaft section 25 (Fig. 4). The manual adjustment of the rigs for obtaining different depths of cultivation is effected by swinging this arm upwardly or downwardly, and the lifting of the several rigs to their inoperative position is also effected through forward swinging movement imparted to such arm. I shall now describe the power lift mechanism which serves to raise the rigs to their transport position. Referring to Figs. 4, 5 and 6, it will be observed that a housing 65 is mounted on one side of the U-shaped frame bar 22. A power take-off drive is extended to this housing through a shaft 66 which extends rearwardly therefrom and has operative conection at its rear end with a suitable power take-off device indicated at 67 in Fig. 1. Such power take-off connection results in the shaft 66 being driven by the motor of the tractor. The front end of the shaft 66 has a universal joint connection 68 with a shaft 69 which has bearing support in the housing 65. The power lift clutch, which is contained within this housing, comprises a driving clutch member 71 and a driven clutch member 72. Both clutch members are mounted on a transverse shaft 73 which has bearing support in the side walls of the housing, and which has bearing support in the side portions of the U-shape frame member 22. The driving clutch member 71 is mounted to rotate freely on the shaft 73, and has a worm wheel 74 formed on one side thereof, with which meshes a worm 75 mounted on the shaft 69. Thus, the driving clutch element 71 rotates constantly during the operation of the implement. The other clutch element 72 is keyed or pinned to the shaft 73. The clutch is of a construction commonly employed on power lift plows and other agricultural implements, being of the type known as the "half revolution" clutch. That is to say, the clutch mechanism has associated therewith certain tripping devices which operate normally to hold the clutch member out of operative connection with each other, but which, when tripped, will cause them to become connected and to remain connected until the clutch has made a half revolution, when they are automatically disconnected by such tripping mechanism. On the next actuation of the tripping mechanism the clutch members are again connected and remain so until they complete the second half of the revolution, when they are again automatically disconnected. As this type of clutch is well known to those familiar with the implement art, it will be unnecessary to describe the construction in specific detail. In its general arrangement, the clutch comprises a series of notches 76 formed around the inner circumferential portion of the driving clutch member 71. These notches are adapted to be engaged by a roller 77 which is mounted on one side of the trigger lever 78, the latter being pivotally supported at 79 on the outer side of the driven clutch member 72. A tension spring 81 is connected to the trigger lever 78 and normally tends to swing the driving roller 77 into the notches 76. The trigger lever 78 is provided with outwardly extending trigger ends 78' which project beyond the periphery of the driven clutch member 72, and are adapted to be engaged by a roller 82 carried by a trip lever 83. A spring is suitably connected to the lever 83 so as normally to hold the roller 82 against the periphery of the clutch member 72, whereby it will be in position to intercept one or the other of the trigger ends 78' to rock the trigger lever and thereby disconnect the clutch members. The periphery of the driven clutch member is provided with diametrically opposite notches 85 in proximity to the trigger ends 78', the arrangement being such that after the roller 82 has actuated one of the trigger ends 78' to release the clutch, the roller will drop into the associated notch 85 and thereby lock the driven clutch member 72 against rotation in either direction. The tripping lever 83 is mounted on a shaft 86 which extends transversely through the upper portion of the housing 65. An arm 87 is secured to the outer end of said shaft and has pivotal connection with a rod 88 which extends rearwardly to a control point adjacent to the operator's seat 17. Here this rod is connected to a handle member 89 which is adapted to be pulled rearwardly when the clutch is to be tripped. It will be understood from the foregoing that whenever such handle member is actuated the two clutch members 71 and 72 will be connected and will rotate the shaft 73 through a half revolution, whereupon the clutch will be released and the shaft will stop; and when the handle member 89 is again actuated the clutch will be reengaged and the shaft 73 will rotate through the other half of its revolution and then stop.

Referring to Figs 2 and 3, the shaft 73 is formed with a crank 91 which is located on the outer side of the U-shaped frame member 22. Pivotally connected to this crank is a link 92 which extends downwardly and rearwardly, and has its other end pivotally connected at 93 to the lower end of an arm or lever 94. The upper end of such arm or lever is mounted on a stationary pivot 95, suitably supported on a bracket carried by the frame of the implement. A long thrusting link 96 is mounted on the swinging pivot 93, and extends forwardly for effecting pivotal connection at 97 with the rock shaft arm 64. It will be evident that each throw of the crank 91 through a half revolution will operate through the link 92, lever 94 and link 96 to swing the arm 64 either forwardly or rearwardly for raising or lowering the several cultivator rigs.

The manually actuated mechanism, which serves to adjust the cultivating depth of all of the rigs in unison, performs such function by changing the position of the arm 64 with respect to the lever 94 determined by the link 96, when the rigs are in operative position, this change being accomplished by adjusting the operating connection between one of the ends of said link and the part to which it is connected. In the illustrated construction such adjustment is made by shifting the point of operative connection between the thrusting link 96 and the rocking arm 64. This master adjusting mechanism comprises a shaft 98 which extends rearwardly to the operator's position, where it is provided with a crank handle 99 through which the shaft is rotated. The rear portion of such shaft is supported in a suitable bracket 101, in which the shaft has play so that the front end thereof can rise and fall. The front end of said shaft has operative connection through a universal joint 102 with an adjusting screw 103 which is journaled in the rocker arm 64. It will be observed that the threaded shank of the screw is disposed in a slotted or open frame portion 104 of such arm. Mounted on said screw, and having threaded engagement therewith is a nut or block 105, the latter having suitable flanges embracing the sides of the slotted frame 104 to prevent rotation of such nut or block with the rotation of the screw. The pivotal connection 97 consists of a pin projecting laterally from such nut or block.

Referring to Fig. 2, it will be seen that when the adjusting screw 103 is rotated to carry the block 105 to the rearward end of the screw, the cultivator rigs will be given a shallow depth adjustment. This follows owing to the fact that the pivot center 93 at the rear end of the thrusting link 96 is held in a stationary position by the power lift clutch, whereby such pivot center functions as a stationary point of reaction, and thus the shifting of the pivot center 97 rearwardly along the screw 103 compels upward swinging movement of the arm 64, with consequent lifting of the cultivator rigs to a shallow depth of cultivation. Conversely, when the screw 103 is rotated in the opposite direction to carry the pivot center 97 to its opposite or forward end, the inability of the link 96 to move forwardly will compel the arm 64 to swing rearwardly, thus moving the cultivator rigs downwardly to a greater depth of cultivation. When the cultivator rigs are in their lower or operative positions, as indicated in full lines in Figs. 2 and 3, the pivot 93 of the link 96 occupies a rearwardly disposed position, which I have designated $l$, and when the rigs are in their raised positions, as indicated in dotted lines in Figs. 2 and 3, the pivot occupies a forwardly disposed position, which I have indicated at $r$.

The adjustability of the block 105 along the screw 103 results in the pivot 97 at the other end of the link 96 having adjusting movement relative to the arm 64 along a predetermined path or line of adjustment, which corresponds to the axis or plane of the screw 103, or to a plane parallel thereto. Such line of adjustment is disposed at an angle which is non-radial with reference to the axis of the rock shaft 25, or which is non-radial with reference to a line extended between said axis and the pivot center 97. The particular angle of this line of adjustment is so related to the pivot center $r$ that when the arm 64 has been swung upwardly in a power lift operation, said line of adjustment will be substantially at right angles to the line of thrusting movement of said link. As another method of expressing this relation, when the link 96 has swung the arm 64 upwardly in a full stroke movement of the link, said line of adjustment of the pivot center 97 will lie substantially tangential to an arc struck from the center $r$ through the pivot center 97. I have indicated this relation by the arc $x$ in Figs. 2 and 3. It will be noted that owing to the considerable radius of this arc the portion thereof corresponding to the length of the adjusting screw 103 is quite flat.

The above described construction and arrangement of the motion transmitting parts interconnecting the rock shaft 25, the power lift mechanism, and the master adjusting means, results in all of the rigs being raised substantially to the same height in a power lift operation irrespective of the adjustments of said master adjusting means.

When the rigs are lifted from a shallow depth adjustment, as shown in Fig. 2, the arm 64 is swung upwardly and forwardly to a predetermined angle, as indicated in dotted lines, and it will be noted that in such position the line of adjustment of the pivot center 97, represented approximately by the plane of the adjusting screw 103, is substantially at right angles to the link 96, or is substantially tangential to the arc $x$. Conversely, when the rigs are lifted from a deep cultivating adjustment, as indicated in Fig. 3, the arm 64 is revolved substantially to this same predetermined angle, as indicated in dotted lines, in which position the line of adjustment of the pivot center 97 is also disposed substantially at right angles to the link 96, or substantially tangentially with reference to the arc $x$. If the rigs have been occupying any intermediate adjustment, the arm 64 will still be swung substantially to this same predetermined angle, since the pivot center 97 will then occupy a position along the arc $x$ intermediate the ends of the screw 103. Hence, irrespective of the depth adjustments which have been established through the master adjusting shaft 98, the power lift mechanism will always raise the rigs substantially to the same predetermined height.

So far as I am aware, this feature of raising the manually adjustable soil tilling members always to the same height in the power lift operation thereof is broadly new, and the claims hereinafter made are, therefore, to be construed accordingly.

I claim:

1. A power lift agricultural implement comprising a wheeled frame, a soil engaging device, parallel link mechanism connecting the latter with said frame for substantially parallel lift movement of said soil engaging device, manually operated means for adjusting said soil engaging device vertically, and power lift means operating through said parallel link mechanism arranged so as to lift said soil engaging device substantially to the same elevated position irrespective of the adjustments of said manually operated means.

2. A power lift agricultural implement comprising a wheeled frame, a plurality of soil tilling rigs parallel link mechanism connecting the latter with said frame for substantially parallel lift movement of said rigs, manually operated means for adjusting said rigs vertically in unison, and power lift means operating through said parallel link mechanism arranged so as always to lift said rigs substantially to the same elevated position irrespective of the adjustments of said manually operated means.

3. Its combination with a tractor comprising a frame and a motor, of a soil engaging device connected with said frame for substantially vertical movement, manually operated means for adjusting said soil engaging device vertically, and means comprising parallel link mechanism driven by said motor for lifting said soil engaging device out of operative position, said latter means operating to raise said soil engaging device in approximately the same angular relation to the horizontal substantially to the same elevated position irrespective of the adjustments of said manually operative means.

4. A power lift agricultural implement comprising a wheeled frame, a rock shaft mounted on said frame, a plurality of cultivating rigs, a link connecting said rock shaft with each of said rigs, a second link connecting each of said rigs with said frame, manually operated means for rocking said shaft, and power lift mechanism operatively connected to said shaft and arranged so as always to rock the shaft to substantially the same angular position in a rig lifting operation, irrespective of the adjustments of said manually operated means, said links operating to maintain said rigs in approximately the same angular relation to the horizontal in the power lift movement of said rigs.

5. The combination with a tractor comprising a frame and a motor of a soil tilling rig connected with said frame for substantially vertical movement, means driven by said motor for lifting said rig out of operative position, means manually operable independently of said motor to adjust the rig vertically, and motion transmitting mechanism including substantially parallel links connecting said power lift mechanism and said manually adjustable means with said rig whereby said power lift mechanism is operative to raise said rig in approximately the same angular relation to the horizontal and substantially to the same height irrespective of the adjustment of said manually operative means.

6. A power lift agricultural implement comprising a wheeled frame, a rock shaft mounted on said frame, a plurality of soil tilling rigs connected with said rock shaft and adapted to be raised and lowered with a substantially parallel lift motion by the rocking of said shaft, an arm connected with said shaft, power lift mechanism adapted to transmit rocking movement to said arm, a pivot connecting said power lift mechanism with said arm, and means for adjusting said pivot diagonally with reference to a radial line between said pivot and the axis of said rock shaft for effecting a master depth adjustment of all of said rigs.

7. A power lift agricultural implement comprising a wheeled frame, a rock shaft mounted on said frame, a plurality of soil tilling rigs connected with said rock shaft adapted to be raised and lowered by the rocking thereof, an arm connected with said rock shaft, power lift mechanism, a lever mounted on said frame, a link connecting said power lift mechanism with said lever, a second link having operative connection with said lever through a first pivot and having operative connection with said arm through a second pivot, and means for adjusting said second pivot along a predetermined line of adjustment relatively to said arm, said pivots and said line of adjustment being so related that when the rigs have been raised in a power lift operation said line of adjustment will extend substantially tangentially to an arc struck from said first pivot through said second pivot.

8. A power lift agricultural implement comprising a wheeled frame, a rock shaft mounted on said frame, a plurality of soil tilling rigs connected with said rock shaft and adapted to be raised and lowered by the rocking thereof in approximately the same angular relation to the horizontal, an arm connected with said rock shaft, power lift mechanism comprising a crank, a lever mounted on said frame, means for transmitting swinging movement from said crank to said lever, a link pivotally connected to said lever, a pivot operatively connecting said link to said arm, and means for adjusting said pivot relatively to said arm.

9. A cultivator comprising a main frame, a cultivator frame mounted on said main frame and having laterally disposed frame extensions connected therewith to swing vertically about longitudinal axes, a transversely extending rock shaft mounted on said cultivator frame, rock shaft extensions mounted on said frame extensions and having coupled connection with said rock shaft, cultivator rigs carried by said frame extensions and connected with said rock shaft extensions so as to be raised and lowered by the rocking thereof, an arm connected with said rock shaft, power lift mechanism adapted to transmit rocking movement to said arm, a pivot connecting said power lift mechanism with said arm, and manually adjustable means for adjusting said pivot relatively to said arm.

10. In an agricultural implement, the combination with a tractor including a motor, of an attachment comprising a frame extending transversely across the front end of the tractor, soil engaging devices connected with said frame for substantially vertical movement, one of said devices extending rearwardly under the tractor, manually operated means for adjusting said soil engaging devices vertically, and power lift mechanism adapted to be actuated by said motor to lift said soil engaging devices substantially to the same elevated position irrespective of the adjustments of said manually operated means.

11. In an agricultural implement, the combination with a tractor including a motor, of an attachment comprising a frame extending transversely across the front end of the tractor and supported thereon, a plurality of soil tilling rigs connected with said frame for substantially vertical movement, the intermediate rigs of the series extending rearwardly under the tractor, manually operated master adjusting means for adjusting said rigs vertically in unison, and power lift mechanism adapted to be actuated by said motor to lift said rigs substantially to the same elevated position irrespective of the adjustments of said manually operated means.

12. A power lift agricultural implement comprising a wheeled frame, a soil tilling rig connected with said frame for substantially vertical movement, a rock shaft extending transversely of the frame, a link connected at one end with said rock shaft to rock therewith, and having its other end pivotally connected with said rig, a second link extending substantially parallel with said first mentioned link and pivotally connected with said frame and with said rig, manually operated master adjusting means for operating said rock shaft to adjust said rig vertically, power lift mechanism connected with said rock shaft and arranged so as always to lift said rig substantially to the same elevated position irrespective of the adjustments of said manually operated means, said links operating to raise said rig vertically with a substantially parallel lift movement under the operation of both said manually operated means and said power lift mechanism.

13. A power lift agricultural implement comprising a wheeled frame, a plurality of soil tilting rigs, parallel link mechanism connecting the latter with said frame for substantially parallel lift movement, master adjusting means for manually adjusting the rigs vertically in unison, independent adjusting means for manually adjusting each rig vertically independently of the others, and power lift means operating through said parallel link mechanism arranged so as always to raise said rigs substantially to the same elevated position irrespective of the adjustments of said master adjusting means.

14. A power lift agricultural implement comprising a wheeled frame, a plurality of soil tilling rigs carried by said frame, a rock shaft mounted on said frame and operable to raise and lower said rigs, a link connecting said rock shaft with each of said rigs, a second link connecting each of said rigs with said frame, an arm connected with said shaft, power lift mechanism adapted to transmit rocking movement to said arm, a pivot connecting said power lift mechanism with said arm, and means for adjusting said pivot diagonally with reference to a radial line between said pivot and the axis of said rock shaft for effecting a master depth adjustment of all of said rigs, said links operating to maintain said rigs in approximately the same angular relation to the horizontal in the raising and lowering thereof.

15. A power lift agricultural implement comprising a wheeled frame, a rock shaft mounted on said frame, a plurality of soil tilling rigs, a link connecting said rock shaft with each of said rigs for raising and lowering said rigs, a second link positioned substantially parallel to said first link for connecting each of said rigs with said frame and cooperating with said first link for maintaining said rigs in approximately the same angular relation to the horizontal during the raising and lowering thereof, an arm connected with said shaft, power lift mechanism adapted to transmit rocking movement to said arm, a pivot connecting said power lift mechanism with said arm, a screw carried by said arm and along which said pivot is adapted to have adjusting movement, and manually actuated means for rotating said screw.

16. A power lift agricultural implement comprising a wheeled frame, a rock shaft mounted on said frame, a plurality of soil tilling rigs, a link connecting said rock shaft with each of said rigs for raising and lowering said rigs, a second link positioned substantially parallel with said first link for connecting each of said rigs with said frame and cooperating with said first link for maintaining said rigs in approximately the same angular relation to the horizontal during the raising and lowering thereof, an arm connected with said rock shaft, power lift mechanism comprising a link adapted to transmit rocking movement to said arm, an operative connection between said link and said arm, and means for adjusting said operative connection to vary the tilling depth of said rigs, said adjusting means being arranged whereby said arm will always be swung substantially to the same angular position in its power operated rig lifting movement irrespective of the adjustments of said adjusting means.

17. A power lift agricultural implement comprising a wheeled frame, a rock shaft mounted on said frame, a plurality of soil tilling rigs, a link connecting said rock shaft with each of said rigs for raising and lowering said rigs, a second link postioned substantially parallel to said first link for connecting each of said rigs with said frame and cooperating with said first link for maintaining said rigs in approximately the same angular relation to the horizontal during the raising and lowering thereof, an arm connected with said rock shaft, power lift mechanism comprising a link having endwise movement, connecting means between said link and said arm, and means for adjusting the position of said connecting means along a predetermined line of adjustment relatively to said arm, said line of adjustment being so related to the line of movement of said link as to lie substantially at right angles thereto when said arm has been moved to its power actuated rig lifting position.

18. A power lift agricultural implement comprising a wheeled frame, a rock shaft mounted on said frame, a plurality of soil tilling rigs, a link connecting said rock shaft with each of said rigs for raising and lowering said rigs, a second link positioned substantially parallel to said first link for connecting each of said rigs with said frame and cooperating with said first link for maintaining said rigs in approximately the same angular relation to the horizontal during the raising and lowering thereof, an arm connected with said rock shaft, power lift mechanism comprising a link having endwise movement, and pivot means connecting said link with said arm and arranged for adjustment along a predetermined line of adjustment relatively to said arm, said line of adjustment being so related to the line of movement of said link as to lie substantially at right angles thereto when said arm has been moved to its power actuated, rig lifting position.

19. A power lift agricultural implement comprising a wheeled frame, a plurality of soil tilling rigs connected with said frame for substantially vertical movement, manually operated master depth adjusting means for adjusting said rigs vertically in unison, substantially parallel link mechanism connecting said rigs with said frame and operable in the raising and lowering of said rigs to maintain the same in approximately the same angular relation to the horizontal, power lift means operating through said parallel link mechanism arranged so as always to lift said rigs substantially to the same elevated position irrespective of the adjustments of said master adjusting means, and independent depth adjusting means for adjusting the operating depths of said rigs independently of each other.

20. The combination with a tractor comprising a motor, of laterally extending frame members pivotally connected with opposite sides of the tractor to swing vertically and to be steered directly by the tractor, a plurality of cultivating rigs connected with said frame members and disposed in planes outwardly beyond the sides of the tractor, lifting connections operating to lift the rigs in approximately the same angular relation to the horizontal, manually operated means on the tractor for actuating said lifting connections to adjust said rigs vertically, and means driven by said motor for actuating said lifting connections to lift said rigs out of operative position, said latter means operating to raise said rigs substantially to the same elevated position irrespective of the adjustments of said manually operated means.

21. A power lift agricultural implement comprising a wheeled frame, a rock shaft mounted on said frame, a plurality of soil tilling rigs connected with said rock shaft and adapted to be raised and lowered by the rocking thereof, an arm carried by said rock shaft, power lift mechanism, a swinging member mounted on said frame, means connecting said power lift mechanism with said swinging member, and a link having pivotal connection at its opposite ends with said arm and said swinging member, respectively, including means operable to shift one of said pivotal connections to adjust the operating position of the rigs.

22. A power lift agricultural implement comprising a wheeled frame, a rock shaft mounted on said frame, a plurality of soil tilling rigs connected with said rock shaft and adapted to be raised and lowered by the rocking thereof, an actuating member carried by said rock shaft, a power lift mechanism, a swinging member mounted on said frame, means connecting said power lift mechanism with said swinging member, and a link having pivotal connection at its opposite ends with said members, respectively, including means for adjusting the pivotal connection between said link and one of said members along a predetermined line of adjustment, said pivotal connections and said line of adjustment being so related that when the rigs have been raised in a power lift operation, movement of said adjustable pivotal connection along its line of adjustment effects substantially no movement of said actuating member.

23. A power lift agricultural implement comprising a wheeled frame, a rock shaft mounted on said frame, a plurality of soil tilling rigs connected with said rock shaft and adapted to be raised and lowered by the rocking thereof with a substantial parallel lift movement, an actuatng member carried by said rock shaft, a power lift mechanism, a swinging member mounted on said frame, means connecting said power lift mechanism with said swinging member, and a link having pivotal connection at its opposite ends with said members, respectively, including means for adjusting the pivotal connection between said link and one of said members along a predetermined line of adjustment, said pivotal connections and said line of adjustment being so related that when the rigs have been raised in a power lift operation, movement of said adjustable pivotal connection along its line of adjustment effects substantially no movement of said actuating member.

24. A power lift agricultural implement comprising a wheeled frame, a rock shaft mounted on said frame, a plurality of soil tilling rigs connected with said rock shaft and adapted to be raised and lowered by the rocking thereof, an actuating member connected with said rock shaft, power lift mechanism, a swinging member mounted on said frame, means connecting said power lift mechanism with said swinging member, and a link having pivotal connection at its opposite ends with said members, respectively, including means operable to adjust the pivotal connection between one of said members and said link along a predetermined line of adjustment, said pivotal connections and said line of adjustment being so related that when the rigs have been raised in a power lift operation said line of adjustment will extend substantially tangentially to an arc struck from the other of said pivotal connections.

25. A power lift agricultural implement comprising a wheeled frame, a rock shaft mounted on said frame, a plurality of soil tilling rigs connected with said rock shaft and adapted to be raised and lowered by the rocking thereof, an actuating member connected with said rock shaft, power lift mechanism, a swinging member mounted on said frame, means connecting said power lift mechanism with said swinging member, and a link having pivotal connection at its opposite ends with said members, respectively, including means operable to adjust the pivotal connection between one of said members and said link along a predetermined line of adjustment, said pivotal connections and said line of adjustment being so related that when the rigs have been raised in a power life operation said line of adjustment will intersect the longitudinal axis of said link.

26. A power lift agricultural implement comprising a wheeled frame, a rock shaft mounted on said frame, a plurality of soil tilling rigs connected with said rock shaft adapted to be raised and lowered by the rocking thereof, an arm member connected with said rock shaft, power lift mechanism, a lever member mounted on said frame, a link connecting said power lift mechanism with said lever member, a second link having operative connection with one of said members through a first pivot and having operative connection with the other of said members through a second pivot, and means for adjusting said second pivot along a predetermined line of adjustment relatively to the latter member, said pivots and said line of adjustment being so related that when the rigs have been raised in a power lift operation said line of adjustment will extend substantially tangentially to an arc struck from said first pivot through said second pivot.

27. A cultivator comprising a main frame, a cultivator frame mounted on said main frame and having a laterally disposed frame extension connected therewith to swing vertically about a longitudinal axis, a transversely extending rock shaft mounted on said cultivator frame, a rock shaft extension mounted on said frame extension and having coupled connection with said rock shaft, cultivator rigs carried by said frame extension and connected with said rock shaft extension so as to be raised and lowered by the rocking thereof, an arm connected with said rock shaft, power lift mechanism adapted to transmit rocking movement to said arm, a pivot connecting said power lift mechanism with said arm, and manually adjustable means for adjusting said pivot relatively to said arm.

28. In an agricultural implement, the combination with a tractor including a motor, of an attachment comprising a frame extending transversely across the front end of the tractor and supported thereon, a plurality of soil tilling rigs connected with said frame for substantially vertical movement, manually operated master adjusting means for adjusting said rigs vertically in unison, and power life mechanism adapted to be actuated by said motor to lift said rigs substantially to the same elevated position irrespective of the adjustments of said manually operated means.

In witness whereof, I hereunto subscribe my name this 16th day of February, 1928.

ELMER McCORMICK.

CERTIFICATE OF CORRECTION.

Patent No. 1,872,314.　　　　　　　　　　　　　　　　　　August 16, 1932.

ELMER McCORMICK.

It is hereby certified that error appears in the printed specification of the above numbered patent requiring correction as follows: Page 2, line 3, for "Browning" read "Brown"; and line 4, for "128,829" read "128,929"; page 3, line 67, for "50" read "60"; and that the said Letters Patent should be read with these corrections therein that the same may conform to the record of the case in the Patent Office.

Signed and sealed this 29th day of November, A. D. 1932.

(Seal)

M. J. Moore,
Acting Commissioner of Patents.